United States Patent [19]
Hiatt

[11] 3,747,378
[45] July 24, 1973

[54] COMBINATION LOCK AND FUEL CUT-OFF VALVE APPARATUS

[76] Inventor: Wilbur L. Hiatt, 3140 N. Meridian St., Indianapolis, Ind. 46208

[22] Filed: Feb. 26, 1971

[21] Appl. No.: 119,296

[52] U.S. Cl............... 70/257, 70/309, 70/431, 137/384.4, 137/554, 174/107, 174/108, 200/16, 200/43, 200/61.86, 287/76
[51] Int. Cl... B60r 25/04, E05b 17/10, E05b 37/02
[58] Field of Search................. 70/309, 311, 25, 70/26, 181, 257; 200/45

[56] References Cited
UNITED STATES PATENTS

| | | | |
|---|---|---|---|
| 431,336 | 7/1890 | Daniels | 70/26 |
| 430,145 | 6/1890 | Peck | 70/25 |
| 387,300 | 8/1888 | Henderson | 70/309 |
| 1,418,778 | 6/1922 | Craddock | 70/309 |
| 1,853,243 | 4/1932 | Thor | 70/309 X |

Primary Examiner—Albert G. Craig, Jr.
Attorney—Woodard, Weikart, Emhardt & Naughton

[57] ABSTRACT

An improved conbination lock and fuel cut-off apparatus to control fuel flow. A valve body is positioned in the fuel input line blocking the flow of fuel. The body is movable by a control wire slidable within an armored cable so as to allow fuel flow. The wire is coupled to a rotatable shaft having a knob mounted to one end. The shaft is locked in place by a combination lock having three independent discs mounted to the shaft. The three discs are rotatable by a shaft key to a predetermined position so as to allow axial movement of the shaft. Each disc is separated from the adjacent disc by a spacer preventing contact between discs. An electrical switch is provided to control current flow and is operable by the rotatable shaft. The lock of this invention is also usable for other applications not related to the control of fuel flow.

4 Claims, 19 Drawing Figures

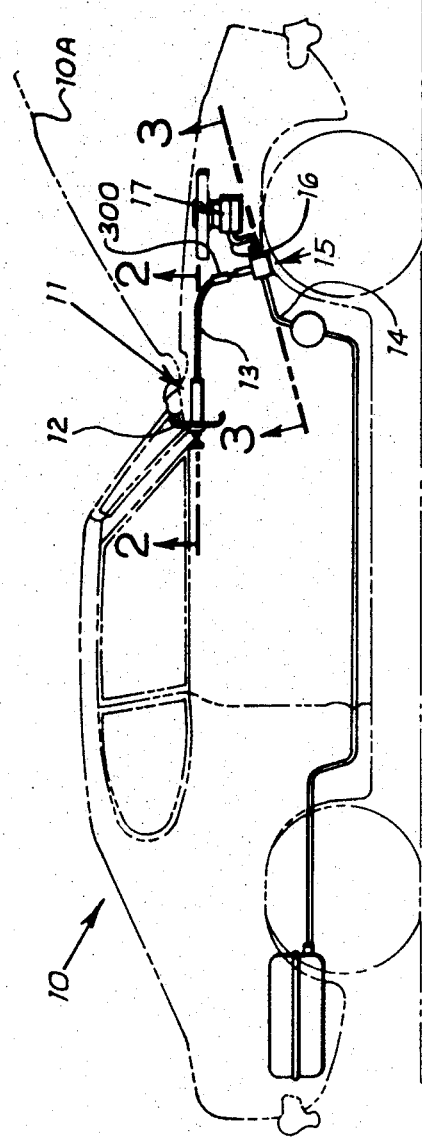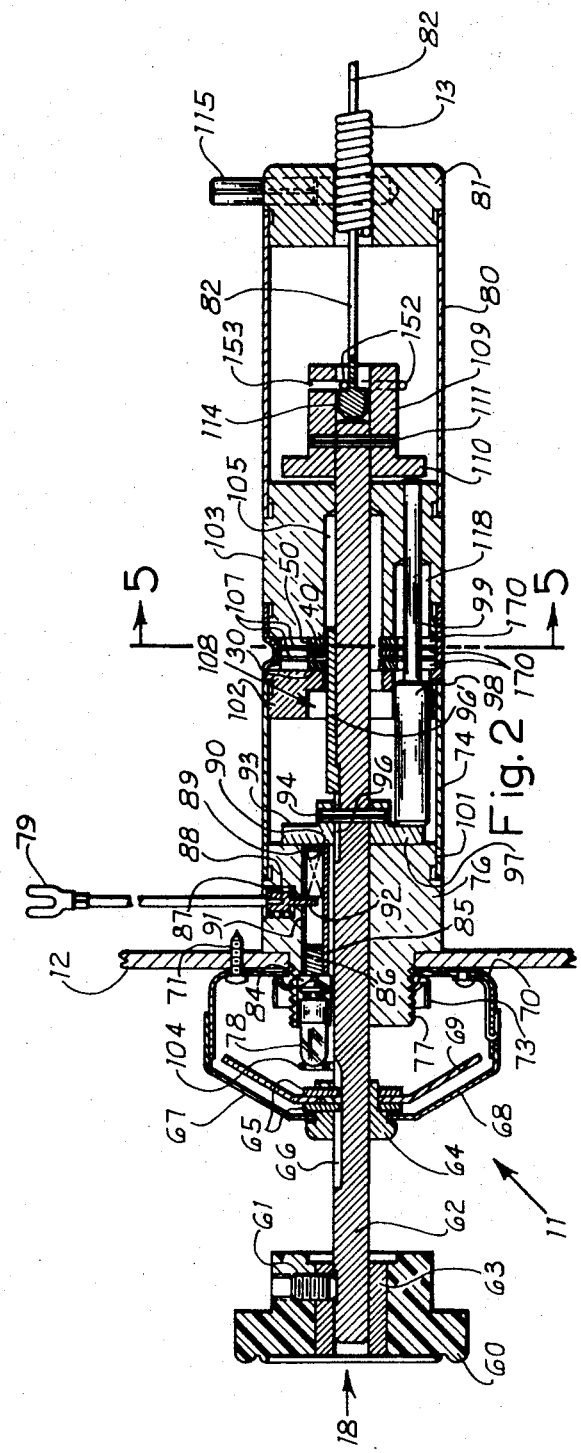

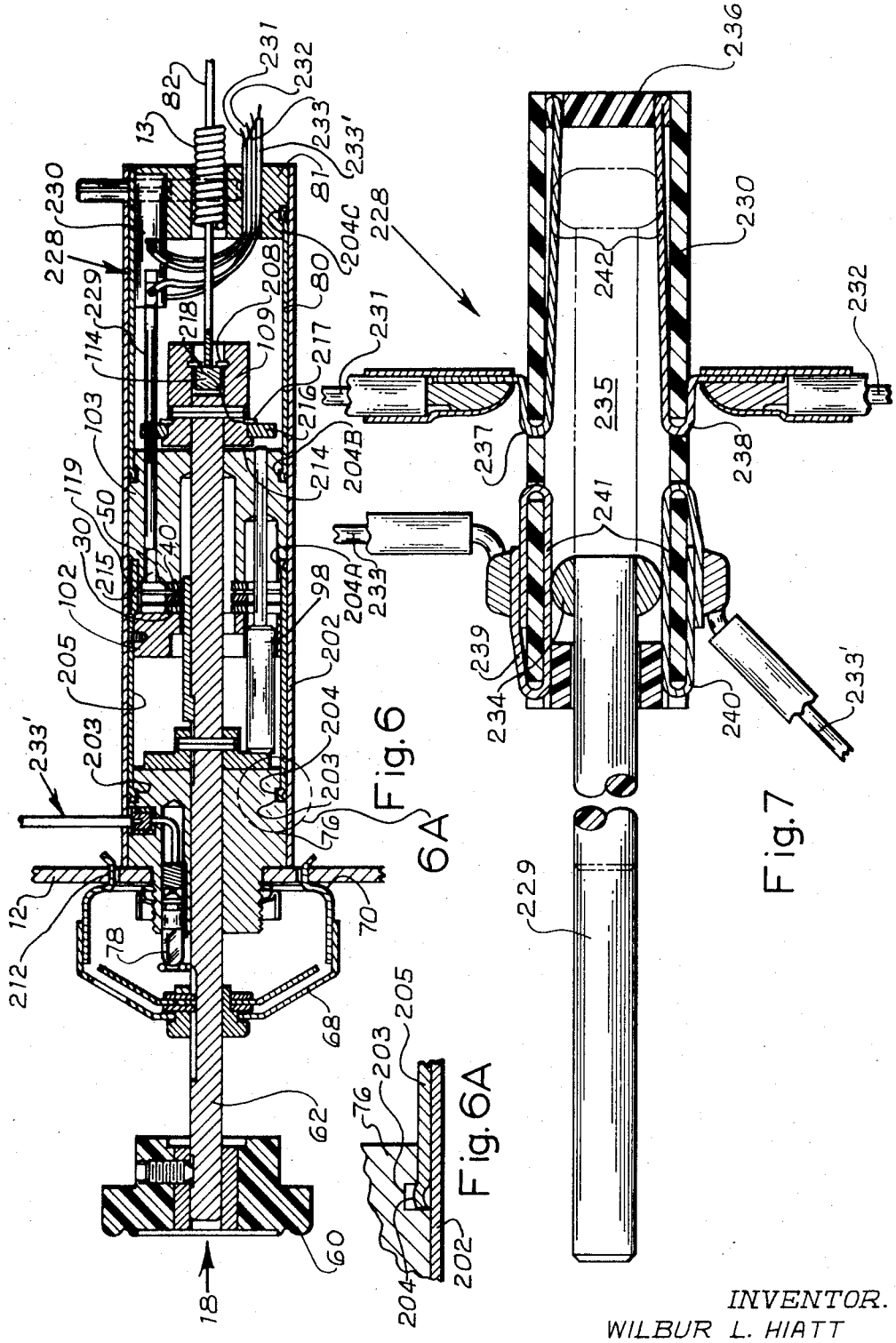

PATENTED JUL 24 1973 3,747,378

INVENTOR.
WILBUR L. HIATT
BY
Woodard, Weikart, Emhardt & Naughton
ATTORNEYS

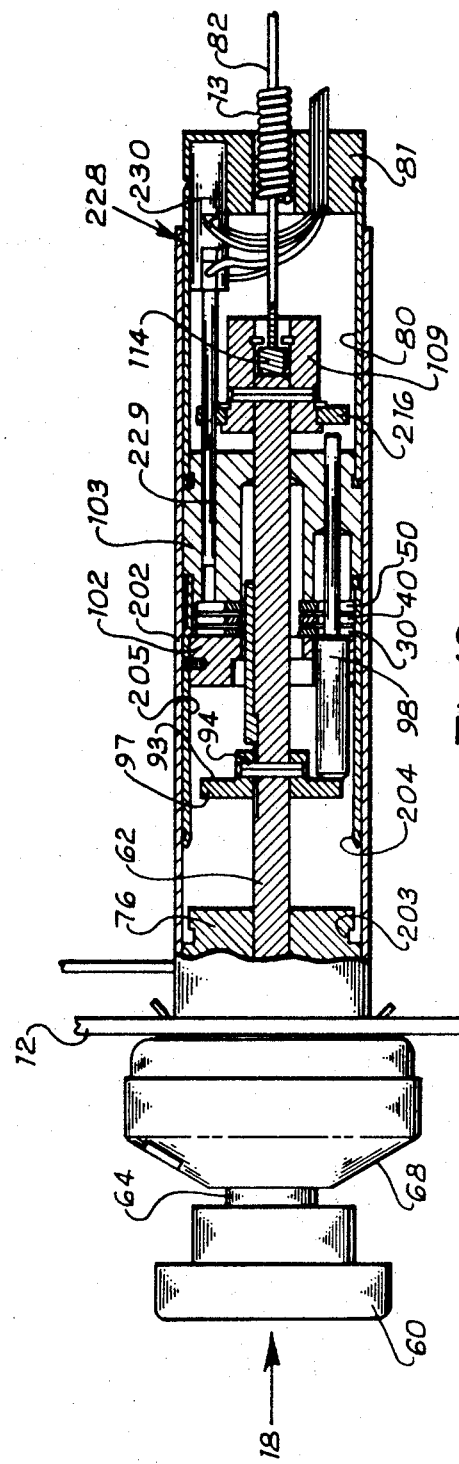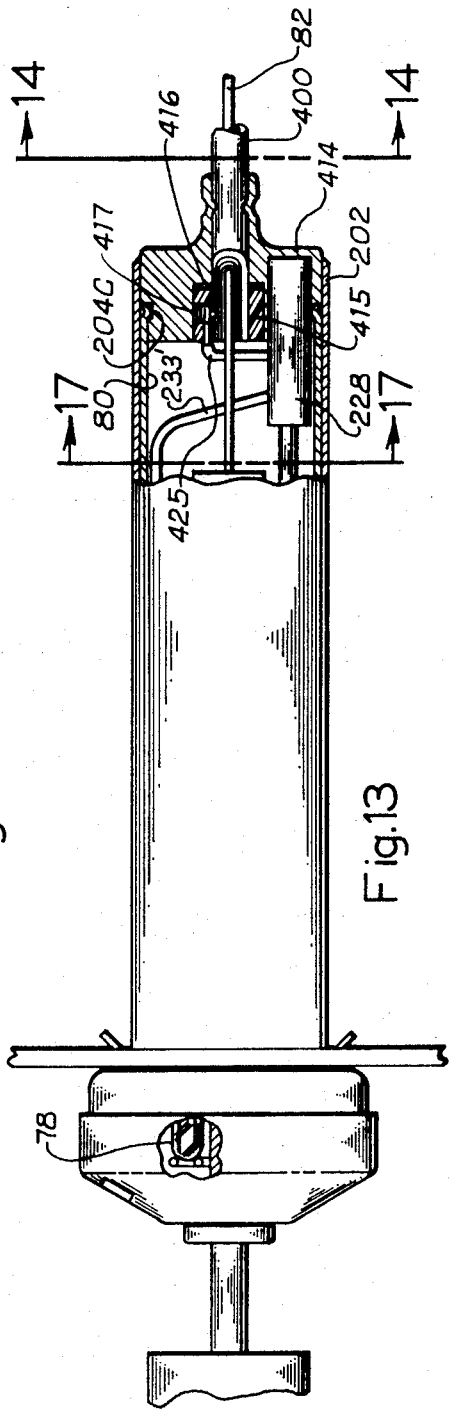

INVENTOR.
WILBUR L. HIATT
BY
Woodard, Weikart, Emhardt & Naughton
ATTORNEYS

COMBINATION LOCK AND FUEL CUT-OFF VALVE APPARATUS

BACKGROUND OF THE INVENTION

1. Field of the Invention

This invention relates to a lock for controlling fuel flow and also relates to a lock mechanism.

2. Description of the Prior Art

A number of locks have been devised to control fuel flow. Typically, these locks have been designed to control fuel flow from an automobile gasoline tank to a carburetor. A representative sample of the prior art is disclosed in the following U. S. Pat. Nos.

1,375,044; 1,455,583; 1,493,336; 1,510,417; 1,520,385; 1,559,370; 1,691,774; 1,942,129; 1,965,920; 2,115,784; 2,594,559; and 2,897,376.

Various other combination locks are also known such as those disclosed in the following U. S. Pat. Nos. 1,312,376; 2,690,664; 2,836,052; and, 3,017,761.

Many of the prior art devices are relatively complex employing various linkages and gear combinations. In addition, many of the combination locks require the operator to rotate several knobs many revolutions. The prior art devices utilize interconnecting components allowing the thief to "pick" the lock by "feeling" out the combination of the lock through his fingers.

From the above background, it can be appreciated that there is a need for a combination lock and fuel cut-off apparatus operable by a single knob which does not have to be turned more than 360°. The apparatus should be lockable in either the on or off position preventing accidental change of position. The lock should be tamper proof having its major locking components free and independent.

SUMMARY OF THE INVENTION

One embodiment of the present invention is a lock and fuel cut-off apparatus comprising a housing, a movable plunger mounted in said housing, first, second and third independent and free discs rotatably mounted in said housing, each of said discs having cut out portions positionable next to said plunger, each of said discs being positioned in spaced relationship to each other, a shaft rotatably mounted in said housing, said shaft projecting through said discs and being laterally movable only when said portions are positioned next to said plunger, a key fixedly fastened to said shaft and projecting through said discs; and a fuel line valve operable by lateral movement of said shaft.

Another embodiment of the present invention is a lock mechanism comprising a housing, a first flat disc of uniform thickness mounted rotatably with respect to said housing, said first disc having a first groove, a second flat disc of uniform thickness parallel to said first disc and mounted rotatably with respect to said housing, said second disc having a second groove and being free and independent of said first disc, a key mounted within said housing being perpendicular to and in driving engagement with said first disc and said second disc, and an arm mounted within said housing being lockingly engageable with said first groove and said second groove.

Yet another embodiment of the present invention is a lock mechanism comprising a frist disc having a first cut out portion and rotatably mounted for rotation about an axis, said first disc having a first recess, a second disc having a second cut out portion and rotatably mounted for rotation about said axis, said second disc having a second recess, an axially movable bolt, a key received in said recesses and movable to engage the walls of said recesses for rotating said discs about said axis, said recesses having different sizes whereby a greater movement of said key is required to rotate said first disc than said second disc, said discs being rotatable to a position wherein said cut out portions are aligned and said bolt is aligned with said cut out portions whereby said bolt can be moved axially through said cut out portions.

A further embodiment of the present invention is a fuel and electrical current cut-off apparatus comprising an outer housing, a movable plunger mounted in said housing, first, second and third independent and free discs rotatably mounted in said housing, each of said discs having cut out portions positionable next to said plunger, each of said discs being positioned in spaced relationship to each other, a shaft rotatably mounted in said housing, said shaft projecting through said discs and being laterally movable only when said portions are positioned next to said plunger, a key fixedly fastened to said shaft and projecting through said discs, a fuel line valve operable by lateral movement of said shaft, and an electrical switch operable by lateral movement of said shaft and being connected to said starter.

In addition, an embodiment of the present invention is an electrical switch comprising a hollow cylinder, a rod having a metal tip slidable in said cylinder, a first pair of metal strips mounted to said cylinder with first surfaces projecting into said hollow cylinder and engageable with said tip, and a second pair of metal strips mounted to said cylinder and longitudinally spaced from said first pair, said second pair having second surfaces projecting into said hollow cylinder and engageable with said tip.

Also, an embodiment of the present invention is a connector for coupling a first and second control wire comprising an outer housing having a first and second end with said first wire slidably projecting through said first end, a traveler slidable in said housing and having said first wire secured thereto, and means on said traveler for lockingly receiving said second wire.

It is an object of the present invention to provide a combination lock and fuel cut-off apparatus operable by a single knob which does not have to be turned more than 360° and which is operable with any fuel feed device in addition to those in automobiles.

It is another object of the present invention to provide a combination lock and fuel cut-off apparatus as previously described which is tamper proof having free and independent locking components.

In addition, it is an object of the present invention to provide a combination lock and cut-off valve which is lcoked in either the on or off position thereby preventing accidental change of position.

Yet another object of the present invention is to provide the previously described apparatus which may be easily installed on a new or used vehicle at a small cost.

Still another object of the invention is to provide an improved combination lock.

A further object of the present invention is to provide an anti-theft protective system which will prevent the flow of fuel to the engine and also prevent current flow to the starter circuit.

Related objects and advantages of the present invention will be apparent from the following description.

BRIEF DESCRIPTION OF THE DRAWINGS

FIG. 1 is a simplified illustration of an automobile equipped with the present invention.

FIG. 2 is a cross sectional view taken along the line 2—2 and viewed in the direction of the arrows of the combination lock shown in FIG. 1.

FIG. 6 is a cross sectional view illustrating a second embodiment of the present invention and taken as if along the line 2—2 and viewed in the direction of the arrows of the combination lock shown in FIG. 1.

FIG. 6A is a fragmentary exploded view of the area enclosed by circle 6A of FIG. 6.

FIG. 7 is an enlarged fragmentary view of switch 228 shown in FIG. 6.

FIG. 12 is the same view as FIG. 6 only with less detail and with the interior parts forced to the unoperable position.

FIG. 13 is the same view as FIG. 6 only with less detail and with another embodiment of the armored cable shown.

DESCRIPTION OF THE PREFERRED EMBODIMENTS

Figure 3:
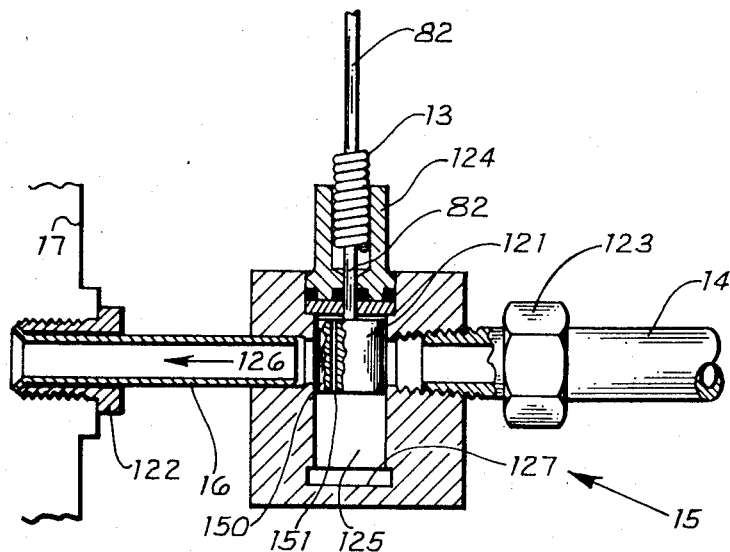
FIG. 3 is a cross sectional view taken along the line 3—3 and viewed in the direction of the arrows of the fuel cut-off device of FIG. 1.

For the purposes of promoting an understanding of the principles of the invention, reference will now be made to the embodiments illustrated in the drawing and specific language will be used to describe the same. It will nevertheless be understood that no limitations of the scope of the invention is thereby intended, such alterations and further modifications in the illustrated device, and such further applications of the principles of the invention as illustrated herein being contemplated as would normally occur to one skilled in the art to which the invention relates.

FIG. 1 is an illustration of an automobile 10 having combination lock 11 mounted to dashboard 12. An armored cable 13 extends from combination lock 11 to fuel cut-off valve 15 mounted to the input fuel line 14. Fuel line 16 connects valve 15 with carburetor 17. It is preferred that valve 15 be located as near to carburetor or fuel injection system 17 as possible so as to minimize the fuel available upon closing of the valve. It is understood that the invention disclosed herein may be utilized to control fuel flow in devices other than carburetors, such as, fuel feeders in diesel and jet engines as well as various igniters.

FIG. 2 is a sectinoal view of the combination lock 11 taken along the line 2—2 of FIG. 1 and viewed in the direction of the arrows. A plastic knob 60 having a brass insert 63 is mounted to the end of shaft 62 by set screw 61. Shaft 62 extends through dial housing 68 which is removably mounted to cup 70 mounted to dashboard 12 by fastening devices 71. A cylindrical housing is mounted to the back of dashboard 12 having mounting plug 76 with threads 77 extending through dashboard 12 and cup 70 into nut 73. Shaft 62 has a key way 66 slidably receiving keys of dial washers 65. The metal dial sleeve 64 is mounted to dial housing 68 allowing shaft 62 to freely rotate therein. Dial 69 is mounted to sleeve 64 by washers 65. Washers 65 frictionally engage dial 69 so as to insure that dial 69 moves always with shaft 62. Housing 68 has a hole 67 allowing a portion of dial 69 to be visible from the front of the housing. Dial 69 is translucent and has, for example, 12 numbers or letters impressed on its surface. An electric lightbulb 78 lights the area immediately behind dial 69 so that the applicable number or letter will be visible through hole 67. In addition, a different color may be used on the dial immediately surrounding each letter or number. The numbers or letters or other symbols of dial 69 represent the rotational position of discs 30, 40 and 50. In order to change this correlation or combination between dial 69 and discs 30, 40 and 50, cover 68 is removed and dial 69 is turned with respect to shaft 62 to the desired position.

Figure 5:
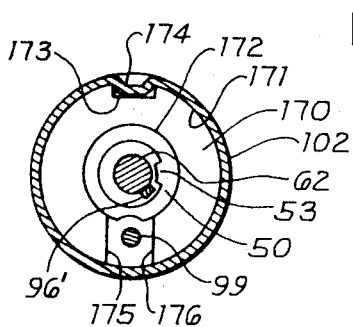
FIG. 5 is a cross sectional view of the mounting of one of the locking discs of FIG. 2 taken along the line 5—5 and viewed in the direction of the arrows.

End 101 of mounting plug 76 is slipped into cylinder 74 and is crimped in place. The opposite end of cylinder 74 is slipped onto the end of front barrel 102 and is also crimped in place. Member 103 is slipped into the adjacent end of front barrel 102 and rear tube 80 is secured therein by suitable fastening means, such as screws or by crimping. Tube 80 is fixedly fastened to rear cap 81. Shaft 62 extends through mounting plug 76 having key way 96 with key 96' fixedly mounted therein. Shaft 62 is fixedly pinned to plate 93 by pin 94. Shaft 62 may be made from suitable metal, such as stainless steel. Front barrel 102 is counterbored at 108 to receive the smaller diametered portion of plate 93. Flange 97 of plate 93 abuts against the end of mounting plug 76 and the front surface of plunger 98. Cavity 105 is provided in member 103 for key 96'. Three locking discs 30, 40 and 50 are rotatably housed in front barrel 102 and are spaced apart by spacers 107. Each disc is free and independent of the other discs. FIG. 5 is a cross sectional view taken along the line 5—5 of FIG. 2 and viewed in the direction of the arrows particularly illustrating the mounting of disc 50. The mounting of disc 50 will now be described, it being understood that a similar description applies for the mounting of discs 30 and 40. Disc 50 is rotatably mounted within holder 170 which is locked in place by crimped portion 174 of front barrel 102 extending down into slot 173. The outer edge 171 abuts and is stationary with the inner surface of barrel 102. The outer edge of disc 50 is slidable with respect to the inner holder edge 172.

Figure 4:
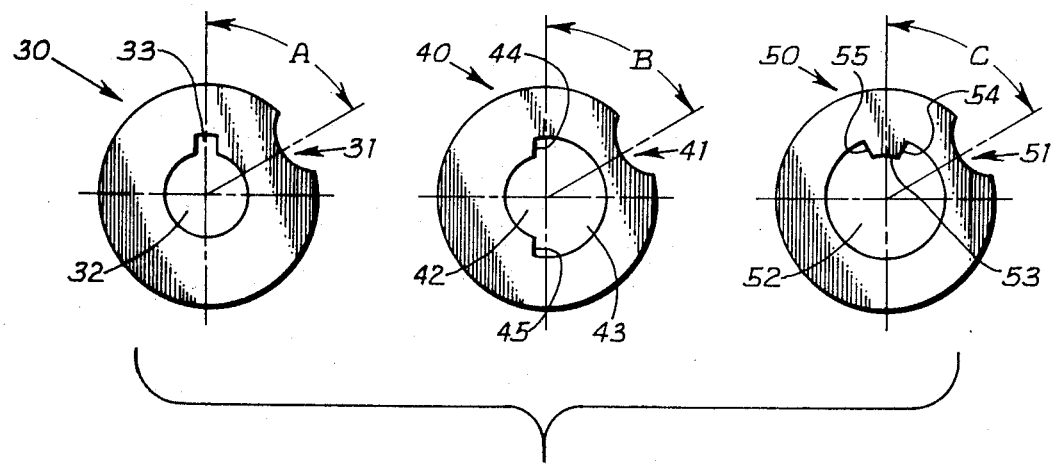
FIG. 4 shows the front disc 30, center disc 40 and rear disc 50 utilized in the combination lock.

The bottom portion of holder 170 is cut out with edges 175 and 176 spaced apart to allow body 98 (FIG. 2) to pass therebetween. Discs 30, 40 and 50 are therefore radially secured by holders 170 and axially secured between barrel 102 and member 103. FIG. 4 illustrates that the discs are circular having cut out 31, 41 and 51 for plunger 98 (FIG. 2) to project through. Each disc has a hole 32, 42 and 52 for slidably receiving shaft 62. Disc 50 is the rear disc and has a tit 52 projecting into hole 52 for engagement with key 96'. As shaft 62 is rotated by knob 60, key 96' will eventually abut side 54 or 55 of tit 53. Center disc 40 has hole 42 enlarged at 43 to receive key 96'. As shaft 62 is rotated, key way 96' will eventually abut side 44 or 45. Front disc 30 has a key hole 33 for receiving key 96'. Thus as shaft 62 is rotated, disc 30 will also rotate. To unlock the device, cut outs 31, 41 and 51 must be aligned in such a way that plunger 98 can project through thereby allowing lateral movement of shaft 62. In order to align cut outs 31, 41 and 51 with plunger body 98, the rear disc cut out is first positioned. The center disc cut out is then positioned with the plunger and the cut out of front disc 30 is the last cut out to be positioned. The numbers or letters on dial 69 are co-ordinated with the positons of the plunger cut outs with respect to the key engaging portion of the disc. It can be appreciated that the key way can be positioned in many locations with respect to the key engaging disc portion. The following table is but one example of a scheme co-ordinating the numbers on dial 69 with the angle between the key engaging portion and the plunger cut out.

TABLE

| Number on Dial | Angle A | Angle B | Angle C |
|---|---|---|---|
| 1 | 180° | 180° | 180° |
| 2 | 210° | 210° | 210° |
| 3 | 240° | 240° | 240° |
| 4 | 270° | 270° | 270° |
| 5 | 300° | 300° | 300° |
| 6 | 330° | 330° | 330° |
| 7 | 360° | 360° | 360° |
| 8 | 30° | 30° | 30° |
| 9 | 60° | 60° | 60° |
| 10 | 90° | 90° | 90° |
| 11 | 120° | 120° | 120° |
| 12 | 150° | 150° | 150° |

Cavity 118 is provided in member 103 for body 98 to project therein when shaft 62 is pushed in the direction of arrow 18. Body 98 is fixedly fastened to rod 99 which abuts the front surface of flange 110 of rear plate 109. Pin 111 fixedly mounts plate 109 to shaft 62. Control wire 82 is fixedly attached to plug 114 which is rotatably received in the hollow center of plate 109. Hairpin clip 152 is positioned in slot 153 of plate 109 and abuts plug 114 thereby allowing shaft 62 to be rotated while wire 82 is stationary and not rotating.

A flexible tube 13 slidingly receives control wire 82 and extends into rear cap 81 being secured therein by pin 115.

A mechanism is provided to allow flow of electrical energy to electric lightbulb 78 only when shaft 62 is located in the outward position. An electrical lead 79 connectable to an electric system has a threaded end received by metal contact pin 88. Insulator 87 is fixedly received into mounting plug 76 thereby insulating pin 88. Bulb 78 is received by cavity 84 provided in plug 76 abutting metal contact plug 86 integrally connected to metal sleeve 85. Spring 90 abuts against the closed metal end 89 of sleeve 85 and also abuts against the lower end 92 of pin 88 which projects through a slot 91 of sleeve 85. Sleeve 85 is slidable in plug 76. As shaft 62 is moved in the direction of arrow 18, flange 97 will move away from plug 76 allowing sleeve 85 to slide in the direction of arrow 18. Eventually, pulg 86 will move from bulb 78 thereby interrupting the flow of electrical energy to the bulb.

Tube retainer 104 is mounted to shaft 62 having an end securing bulb 78. A suitable insulating sleeve, not shown, insulates sleeve 85 from plug 76 and end 89 from flange 97. The insulating sleeve is also slotted at 91.

FIG. 3 is a cross sectional view taken along the line 3—3 and viewed in the direction of the arrows of the fuel cut-off valve 15 illustrated in FIG. 1. Valve 15 is mounted to fuel line 14 by coupling 123 and is hollow having valve cavity 125 communicating with fuel line 14 and fuel line 16. Fuel line 16 is connected to carburetor 17 by coupling 122. Plunger 121 is fixedly mounted to the end of control wire 82 and is slidable within cavity 125. Plunger 121 is shown in FIG. 3 as blocking the flow of fuel from fuel line 14 to fuel line 16. Fuel flow in the direction of arrow 126 occurs when plunger 121 is moved down abutting bottom 127 of cavity 125. Armored cable 13 is fixedly mounted to the hollow cavity of valve bonnet 124 which is sealingly mounted to valve 15. Piston 121 is cut away at 150 illustrating that hole 151 extends through the piston to allow trapped fuel to pass through the moving piston.

To operate the present invention, knob 60 should be turned causing shaft 62 to rotate rear disc 50. Key 96' will engage sides 54 or 55 (FIG. 4). The knob is turned to the combination number which positions cut out 51 adjacent to plunger body 98. Next, the knob is turned in the opposite direction to the second number combination which causes key 96' to engage side 44 or 45 of center disc 40. Disc 40 should be rotated to the second number combination which causes the cut out 41 to be located adjacent plunger body 98. Next, the knob is turned in the opposite direction to the third member of the combination which corresponds to locating cut out 31 immediately adjacent to plunger body 98. When the three discs are so arranged with their plunger cut outs aligned, knob 60 may be pushed in the direction of arrow 18 causing control wire 82 to force valve 121 to bottom 127 of cavity 125 thereby allowing fuel flow in the direction of arrow 126.

FIG. 6 is the same view as FIG. 2 only showing a second embodiment of the present invention. The second embodiment includes all of the features of the first embodiment plus two additional features. First, an outer housing 202 extends from dashboard 12 to the end of rear cap 81. Housing 202 is secured to plug 76 by means of a press fit and is loose fitted with respect to rear plug 81, rear tube 80, member 103 and inner housing 205. FIG. 6A is a fragmentary exploded view of the area enclosed by circle 6A of FIG. 6. Inner housing 205 has dimples 204 which extend into groove 203 of plug 76. Likewise, the opposite end of housing 205 has dimples 204A securing housing 205 to member 103. The ends of rear tube 80 have dimples 204B and 204C securing the rear tube to member 103 and rear cap 81. Although only one each of dimples 204, 204A, 204B and 204C are shown it is understood that a plurality of each of these dimples are positioned around the circumferential extremity of the tubes. A thief or other such person may try to force rod 62 in the direction of arrow 18 (FIG. 6) with the expectation of causing relative movement between control wire 82 and cable 13 so as to open fuel valve 15 (FIG. 3). In order to prevent this from occurring, inner housing 205 is secured to plug 76 with only two dimples 204 whereas three dimples 204A secure housing 205 to member 103 and three of each dimples 204B and 204C are provided in rear tube 80. Thus, in the event that shaft 62 is struck with a hard blow in the direction of arrow 18, plunger body 98 will impact stainless steel discs 30, 40 and 50 causing dimples 204 to disengage groove 203 thereby forcing housing 205 to separate from plug 76. Dimples 204A, 204B and 204C will not disengage thereby forcing the interior parts of the combination lock to the position shown in FIG. 12, and preventing control wire 82 to longitudinally move with respect to cable 13 and thereby preventing the opening of fuel valve 15. Discs 30, 40 and 50 will also be broken and the device will be inoperative. Outer housing 202 being press fitted with respect to plug 76 will not move with inner housing 205 and will thereby conceal the damage to the device.

The second major feature and distinction of the embodiment shown in FIG. 6 and contrasted to the embodiment shown in FIG. 2 is the addition of electrical switch 228 having an outer housing 230 secured in rear plug 81.

FIG. 7 is an enlarged fragmentary side view of the electrical switch shown in FIG. 6. Switch 228 has a hollow housing 230 with a plug 236 secured to and closing one end of the housing. The opposite end of the housing slidingly receives plunger 229 having a large diametered metal tip 234. Mounted to housing 230 is a pair of closed looped metal strips 239 and 240. Strips 239 and 240 extend through the walls of housing 230 so as to have mutually facing surfaces 241 positioned in hollow interior 235 of switch housing 230. A second pair of metal strips 237 and 238 are mounted to housing 230 also having mutually facing surfaces 242 projecting into hollow interior 235. Strips 237 are secured to housing 230 by plug 236. Thus, plunger 229 may be inserted into hollow 235 with tip 234 first contacting and depressing surfaces 241 and then contacting and depressing surfaces 242.

Figure 8:
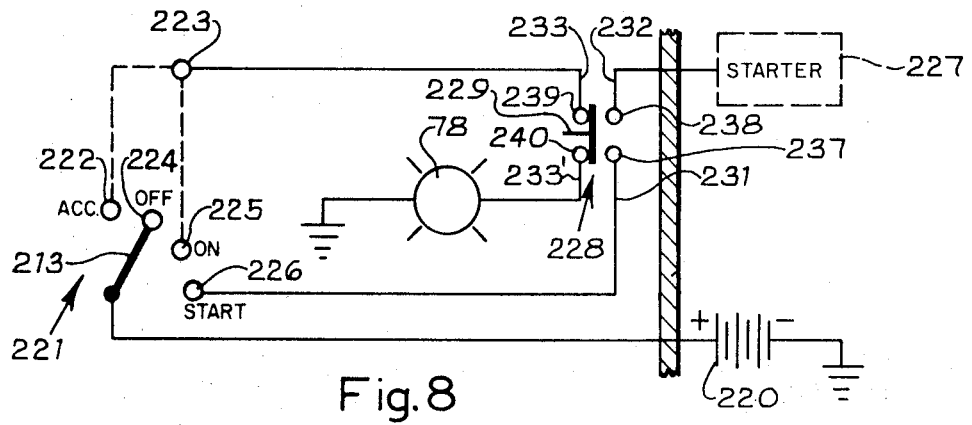
FIG. 8 is an electrical schematic showing switch 228 connected between the starter and the ignition switch.

FIG. 8 is an electrical schematic showing a conventional battery 220 connected to ignition switch 221. The movable arm 213 may be moved to contact 222 or contact 225 in order to route electrical energy to accessory power terminal 223. Movable arm 213 is movable past off position 224 and on position 225 to start position 226 for routing electrical energy to starter 227. The electrical switch 228 shown in FIG. 7 is connected between start position 226 and starter 227. Wire 231 is connected to contact 226 and strip 237. Starter 227 is connected by wire 232 to strip 238. Thus, when plunger 229 is pushed into housing 230 (FIG. 7) tip 234 will contact surfaces 242 routing electrical energy from strip 237 to strip 238 and to starter 227. Strip 239 is connected to accessory terminal 223 by wire 233 and strip 240 is connected by wire 233' to lightbulb 78 mounted to plug 76 (FIG. 6). Thus, when plunger 229 is positioned between surfaces 241, electrical energy will be routed to bulb 78. Plunger 229 (FIG. 6) extends freely into cavity 215 of member 103 and is fixedly fastened by a set screw or other suitable means to collar 216 positioned on rear plate 109 between flange 214 and removable spring washer 217 received by channel 218. Collar 216 is slidably mounted remaining in a fixed position as plate 109 rotates with shaft 62. As shaft 62 moves in the direction of arrow 18, plunger 229 will move further into housing 230. Likewise, when knob 60 is pulled outward, plunger 229 will move in a direction opposite of arrow 18 thereby closing contact surfaces 241 (FIG. 7). Wires 231, 232, 233 and 233' extend out through rear cap 81, and are connected as previously described.

Another difference between the embodiment shown in FIGS. 2 and 6 is the replacement of fasteners 71 (FIG. 2) with tabs 212 (FIG. 6) which are integrally attached to cup 70 projecting into holes provided in dashboard 12. Housing 74 (FIG. 2) has been replaced with a longer housing 205 (FIG. 6) which extends over and beyond barrel 102 being secured to member 103 by means of depression 119. Front barrel 102 is secured to inner housing 205 by means of set screws. Another distinction is the replacement of hairpin clip 152 (FIG. 2) with a spring loaded washer 208 (FIG. 6) received within a groove in rear plate 109.

Figure 9:
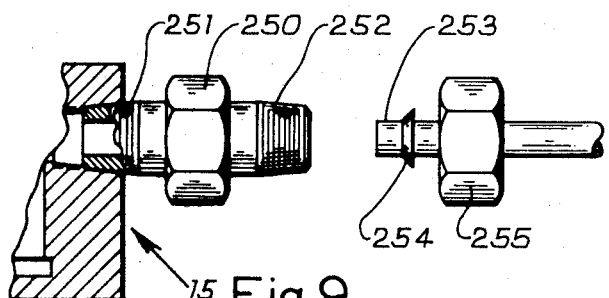
FIG. 9 is a portion of FIG. 3 only showing a second embodiment of the fuel line coupling.

FIG. 9 is a partial view of the fuel cut-off valve 15 shown in FIG. 3 with coupling 123 (FIG. 3) replaced with coupling 250 (FIG. 9). Threaded end 251 of coupling 250 is received by the main body of valve 15 and is permanently secured therein by means of pins or adhesives. The opposite threaded end 252 of coupling 250 is hollow and receives fuel line 253. A self-flaring fitting 254 secured to fuel line 253 is received and forced against the countersunk end of threaded portion 252. Hexagonally shaped nut 255 is threaded onto portion 252 thereby flaring fitting 254 and permanently securing line 253 to coupling 250. Coupling 250 including fitting 254 is commercially available, for example, from the Crawford Fitting Company, 29500 Solon Road, Solon, Ohio 44139 under Model No. Steel 600–I–4.

Figure 10:
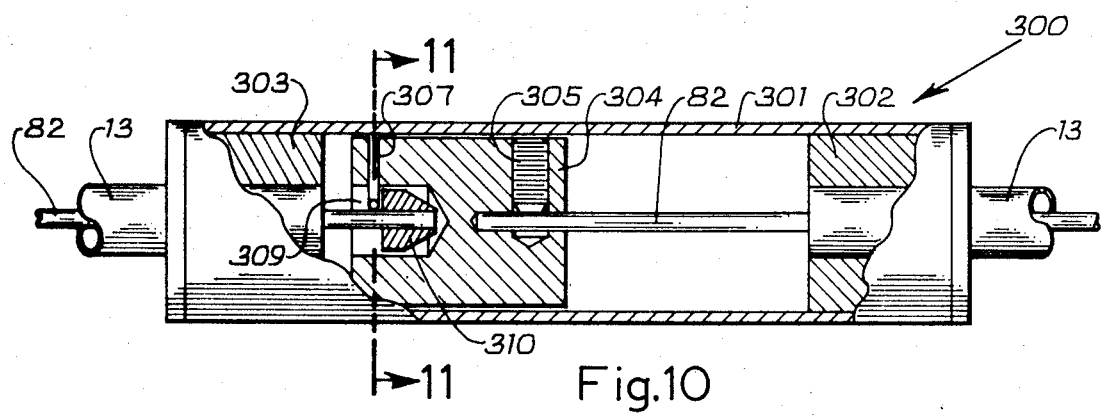
FIG. 10 is an enlarged fragmentary view of a control connector incorporating the present invention.
Figure 11:
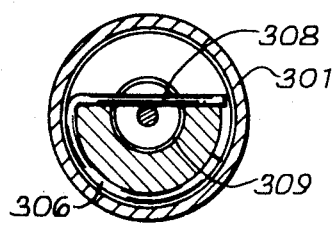
FIG. 11 is a cross sectional view taken along the line 11—11 of FIG. 10 and viewed in the direction of the arrows.

When installing the apparatus disclosed herein, difficulty is encountered with routing the control wire 82 and cable 13 since in many uses a fire wall is positioned between the lock portion of the apparatus and the fuel valve portion of the apparatus. The control connector shown in FIG. 10 alleviates the difficulty and allows the lock portion to be installed separately from the fuel valve portion. The control wires are then connected by the device of FIG. 10. Connector 300 has an outer cylindrical housing 301 capped on both ends by plugs 302 and 303 fixedly attached thereto. Caps 302 and 303 are spaced apart a distance greater than the movement of plunger 121 (FIG. 3). The control wire 82 connected to plunger 121 passes freely through cap 302 and is anchored by fastening device 305 to traveler 304. Cable 13 connected to valve 15 (FIG. 3) is fixedly secured to plug 302 by a pin or other suitable fastening device. The opposite end of traveler 304 has a spring clip 306 (FIG. 11) positioned in slot 307. The flat portion 308 of clip 306 projects through hole 309 of traveler 304. Control wire 82 connected to the lock portion shown in FIG. 2 has a generally conically shaped plug 310 (FIG. 10) fastened to its free end. After the lock of FIG. 2 and the valve of FIG. 3 have been installed, plug 310 (FIG. 10) may be freely inserted through cap 303 and into hole 309 where it will be retained therein by clip 306. Cable 13 is then secured to cap 303 by a pin or other suitable means.

It can be appreciated that through the utilization of the system disclosed herein, that greater security is achieved. For example, incorporation of this system into the automobile 10 shown in FIG. 1 would require the thief to lift hood (10A) in order to attempt deactivation of valve 15, connector 300 or of the electrical circuitry of FIG. 8.

Figure 14:
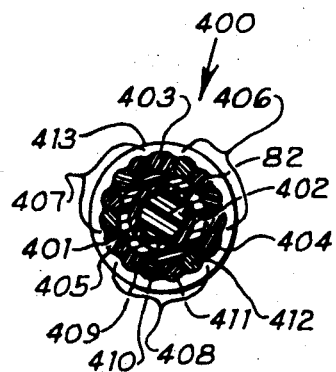
FIG. 14 is an enlarged cross sectional view taken along the line 14—14 of FIG. 13 and viewed in the direction of the arrows.

FIG. 13 is a cross sectional view similar to FIG. 6 only with less detail and showng another embodiment of the armored cable enclosing control wire 82. FIG. 14 is an enlarged cross sectional view of the armored cable 400. Control wire 82 is slidable within tube 401 which is encased in tube 402. Tube 401 may be produced from polytetrafluoroethylene sold under the trademark "Teflon" by E.I. DuPont DeNemours & Co., Inc., Wilmington, Del., whereas tube 402 may be produced from nylon. Three groups 406, 407 and 408 of hardened wires are spirallingly wrapped around tube 402 extending the length thereof. Each group of wires has, for example, four wires in abutting relationship. Group 408 has wire 409 contacting wire 410 which contacts wire 411 in contact with wire 412. Groups 406, 407 and 408 are spaced apart by insulating polyethylene strands 403, 404 and 405. The cable has an outer neoprene extruded tube 413 enclosing the wires and insulating strands. Each group of wires is utilized for electrically connecting switch 228 to the starter and for connecting light 78 to a source of electrical energy.

Figure 17:
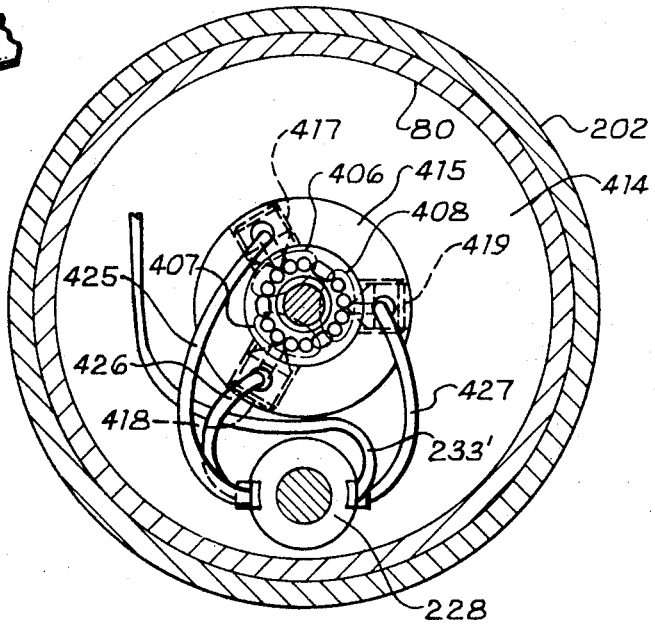
FIG. 17 is an enlarged cross sectional view taken along the line 17—17 of FIG. 13 and viewed in the direction of the arrows.

The rear cap 414 (FIG. 13) is secured to rear tube 80 by dimples 204C. In addition, the outer housing extends around the rear cap 414 in a general slip fit fashion. A hollow nylon insert 415 is received by cavity 416 of cap 414. Cable 400 extends through the hollow centers of cap 414 and insert 415 and is secured therein by crimping to cap 414. The tips of set screws 417, 418 and 419 extend into tube 413 so as to contact a group of wires 406, 407 and 408. That is, screw 417 (FIG. 17) contacts wire group 406, screw 418 contacts wire group 407 and screw 419 contacts wire group 408. Three wires 425, 426 and 427 extend into insert 415 so as to contact the set screws and are connected at their opposite ends to switch 228.

Figure 16:
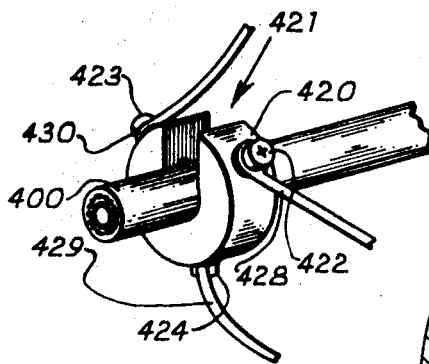
FIG. 16 is a perspective fragmentary view of cable 400 with collar 420 thereon.

FIG. 16 is a perspective view of a portion of cable 400 located, for example, between device 11 (FIG. 1) and valve 15. A connector collar 420 has a slot 421 so as to allow the collar to be snapped onto the cable. Three set screws 422, 423, and 424 are threadedly received by the collar and extend into tube 413 so as to respectively contact wire groups 407, 406 and 408. Screws 422 – 424 are electrically insulated, such as, by producing collar 420 from a plastic. Three wires 428, 429 and 430 are connected respectively to set screws 422, 424 and 423.

Figure 15:
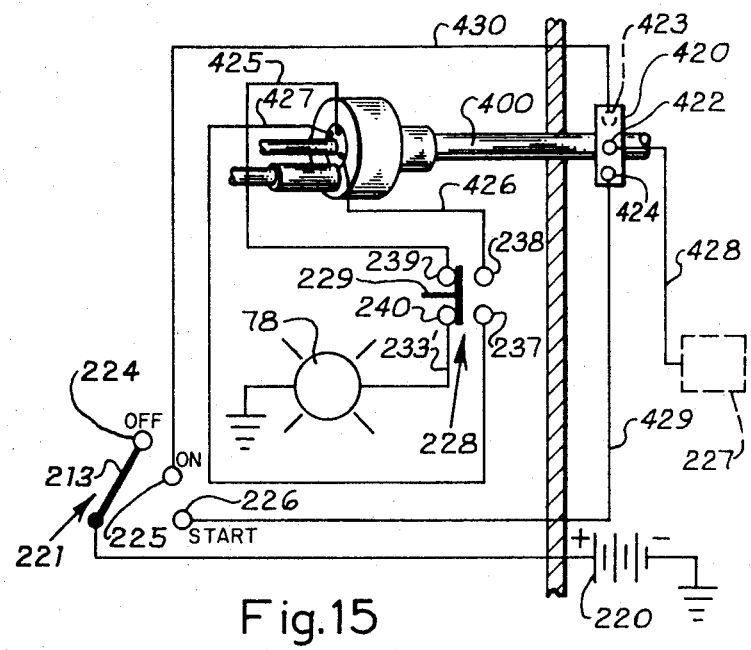
FIG. 15 is an electrical schematic showing cable 400 as related to the electrical circuitry for the present invention.

FIG. 15 is a schematic of the electrical circuitry of the embodiment shown in FIGS. 13, 14, 16 and 17. Starter 227 is connected across contacts 238 and 237 of switch 228 to start position contact 226 of switch 221. Wire 428 of starter 227 is connected to set screw 422 which contacts wire group 407 (FIG. 17) which in turn is connected to wire 426 and contact 238. Likewise, wire 429 is connected to set screw 424 which contacts wire group 408 (FIG. 17) which in turn is connected to wire 427 and contact 237. Thus, as movable arm 229 touches contacts 237 and 238, starter 227 is connected to switch contact 226.

A variety of different methods may be utilized to connect wires 425 – 427 and 428 – 430 to wire groups 406 – 408. In the embodiment just described, wires 425 – 427 extend into the set screw holes and are meshingly forced into the wire groups. For example, wire 425 (FIG. 13) extends into the hole receiving screw 417 and is forced into wire group 406 by the tip of the set screw. Preferably, solder connections are accomplished from wire groups 406, 407 and 408 to wires 425, 426, 427 and wires 423, 422 and 424. Thus, set screws 417 – 419 are unnecessary if wires 425 426 and 427 are soldered respectively to wire groups 406, 407 and 408. Likewise, collar 420 may be deleted by simply soldering wires 428, 429 and 430 respectivey to wire groups 407, 408 and 406.

The source of electrical energy 220 (FIG. 15) is connected to movable arm 213 of ignition switch 221. The "ON" contact 225 is connected via wire 430 to wire group 406 which is connected via wire 425 to contact 239. Contact 240 is connected by wire 233' to light 78. Thus, light 78 will be connected to source 220 whenever arm 213 touches contact 225 and arm 229 is pulled outwardly so as to touch contacts 239 and 240. Wires 430 and 425 are connected to wire group 406 in a manner identical to that described for wire groups 407 and 408. Wire 233' extends through the length of the device and is connected to light 78. Suitable clearance holes may be provided in member 103, barrel 102 and plug 76 for wire 233'.

It can be appreciated that since wire groups 406, 407 and 408 spirallingly extend the length of cable 400, that difficulty may be encountered when connecting collar 240 to cable 400 and wires 428 – 430 to wire groups 406 – 408. For example, a single set screw of collar 420 may be positioned so as to contact two groups of wires instead of only contacting the desired single group of wire. To check against this eventuality the knob 60 should be pulled to the most outward position thereby closing contacts 239 and 240 (FIG. 15). Each wire 428 – 430 should then be touched to source 220 until bulb 78 is lighted. If more than one wire lights bulb 78, the collar 420 should be loosened and rotated approximately 45° with respect to cable 400 and the bulb should be rechecked. Eventually, only one wire will light bulb 78 and this wire should be connected to "ON" contact 225.

Figure 18:
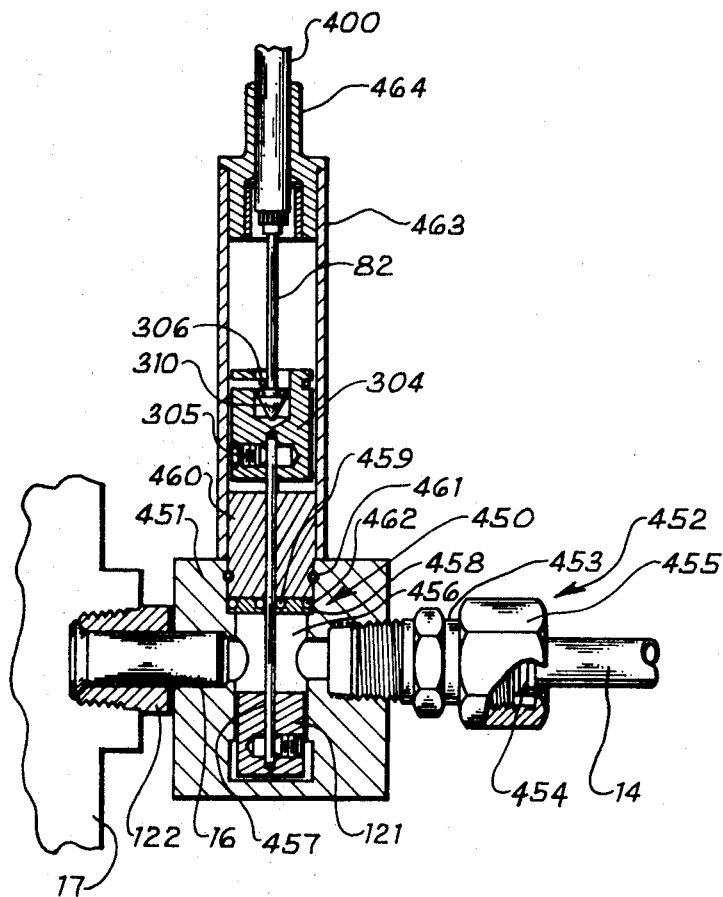
FIG. 18 is a cross sectional view of another embodiment of the fuel cut-off device of FIG. 3 combined with the control connector shown in FIG. 10.

FIG. 18 is a cross sectional view of another embodiment of the fuel cut-off device 15 (FIG. 3) and the control connector 300 (FIG. 10) which have been combined into a single fuel cut-off assembly 450. The body 451 of assembly 450 is similar to the body of device 15 (FIG. 13) being mounted to fuel line 14 by coupling 452 which has a hollow element 453 threaded into body 451. A self-flaring fitting 454 is received in member 452 locking fuel line 14 to the coupling as nut 455 is tightened on member 452 thereby flaring fitting 454. Body 451 is hollow having valve cavity 456 communicating with fuel line 14 and fuel line 16 which is connected to carburetor or fuel injection system 17 via coupling 122.

Plunger 121 is fixedly mounted to the end of wire 457 and is slidable within cavity 456. The plunger is shown in FIG. 18 as allowing fuel flow from fuel line 14 to fuel line 16. Fuel flow is stopped when the plunger is moved from the bottom of the cavity between the fuel lines. Wire 457 is fixedly mounted to traveler 304 by set screw 305 and is freely slidable through plate 458, ring seal 459 and plug 460. Plate 458 and plug 460 are received in a counterbore in body 451 with plug 460 being secured thereto by straight pins 461. A second ring seal 462 seals plate 458 to body 451.

The outer housing 463 of the connector portion of assembly 450 is pressed onto plug 460 so as to prevent relative motion therebetween. Likewise, a second plug 464 is forced into the opposite end of housing 463 so as to prevent relative motion between plug 464 and housing 463. Cable 400 is received by plug 464 being crimped therein and control wire 82 extends into housing 463 having a conically shaped plug 310 fastened to its free end. Plug 310 is secured to traveler 304 by spring clip 306 in a manner identical to that previously described and illustrated in FIGS. 10 and 11.

It will be obvious from the above description that the present invention provides a combination lock and fuel cut-off apparatus operable by a single knob which does not have to be turned more than 360°. The apparatus may be utilized on a variety of vehicles and engines. The apparatus may be arranged to lock in either the off or on position preventing accidental change of position. For example, in the embodiment shown in FIG. 2, shaft 62 may be locked when knob 60 is pulled outward from dashboard 12. An apparatus similar to the apparatus of FIG. 2 enables shaft 62 to be locked when knob 60 is pushed inward with respect to dashboard 12 by reversing plunger 98, barrel 102 and member 103. That is, by positioning the larger diametered portion of plunger 98 and barrel 102 towards the end plug 81 while positioning rod 99 and member 103 towards the front plug 76, the shaft may be locked in the inward position.

In addition, the appratus may be easily installed on new or used vehicles at a small cost. It will be further obvious that the combination lock is tamper proof having free and independent components. In addition, it will be obvious that the present invention provides an anti-theft protective system which will prevent the flow of fuel to an engine and also prevent current flow to the starter circuit. The lock and valve is applicable to flow of any fuel or liquid. The lock can be applied to many other applications, such as, door locks.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A lock mechanism comprising: a first housing;
a first disc received within said first housing and having a first cut out portion and rotatably mounted for rotation about an axis, said first disc having a first recess;
a second disc received within said first housing and having a second cut out portion and rotatably mounted for rotation about said axis, said second disc having a second recess;
an axially movable bolt having a reduced diameter portion and a larger diameter portion;
a key received in said recesses and movable to engage the walls of said recesses for rotating said discs about said axis;
a shaft having said key mounted thereon and extending through said first disc and said second disc and rotatable about said axis;
said recesses having different sizes whereby a greater movement of said key is required to rotate said first disc than said second disc;
said discs being rotatable to a position wherein said cut out portions are aligned with one another and with said bolt whereby the enlarged portion of said bolt can be moved axially through said cut out portions;
holders fixedly secured to and within said housing and having said first disc and said second disc rotatably mounted therein, and
a pair of members each pinned to said shaft, said members being spaced apart and having said bolt received therebetween, said members being positioned closely adjacent to said bolt whereby axial movement of said shaft also moves said bolt axially.

2. The lock mechanism of claim 1 additionally comprising:
a plug secured to said housing and providing bearing means for said shaft;
a dial housing fixed relative to said first housing and having said shaft extending therethrough, said dial housing having an opening therethrough;
a transluscent dial having indicia thereon visible through said dial housing opening, said dial being keyed to said shaft;
a knob mounted on said shaft for rotation of said shaft and for movement of said shaft into unlocked position wherein said shaft moves into said first housing and said bolt moves into said cut out portions, said knob being movable to pull said shaft out of said first housing into a locked position;
a light mounted in said dial housing beneath said dial for lighting said dial when said shaft is in said unlocked position, said light being fixed relative to said first housing;
and electrical conductor means reciprocably mounted on said plug and engageable with said light for providing energizing current thereto;
spring means acting between said plug and said conductor means for urging said conductor means out of engagement with said light;
one of said pair of members being engageable with said conductor means when said shaft is moved into locked position to cause said conductor means to engage said light.

3. The lock mechanism of claim 1 additionally comprising:
a plug secured to said first housing by a dimple and groove connection, said plug providing bearing means for said shaft and adapted for mounting on a dashboard or the like;
a second housing secured to said plug and surrounding said plug and said first housing;
said dimple and groove connection being sufficiently weak to break loose and permit said first housing, discs, holders, bolt, key, and pinned members to move longitudinally in said second housing when said shaft is forced axially.

4. The lock mechanism of claim 3 wherein:
one of said pair of members has a hollow center which is coaxial with said shaft, said one member also having a slot leading into said hollow center;
a control wire having an enlarged head thereon which head is received within said hollow center;
and a hair pin clip received within said slot and retaining said head within said hollow center.

* * * * *